US007946224B2

(12) United States Patent
McFadden

(10) Patent No.: US 7,946,224 B2
(45) Date of Patent: May 24, 2011

(54) GRIDDLE

(75) Inventor: David H. McFadden, Lexington, MA (US)

(73) Assignee: Turbochef Technologies, Inc., Atlanta, GA (US)

( * ) Notice: Subject to any disclaimer, the term of this patent is extended or adjusted under 35 U.S.C. 154(b) by 800 days.

(21) Appl. No.: 11/927,990

(22) Filed: Oct. 30, 2007

(65) Prior Publication Data
US 2008/0105136 A1 May 8, 2008

Related U.S. Application Data

(63) Continuation of application No. 11/098,280, filed on Apr. 4, 2005, now Pat. No. 7,360,533, and a continuation-in-part of application No. 10/614,268, filed on Jul. 7, 2003, and a continuation-in-part of application No. 10/614,532, filed on Jul. 7, 2003, and a continuation-in-part of application No. 11/392,050, filed on Mar. 29, 2006.

(51) Int. Cl.
*A23B 4/03* (2006.01)
*H05B 6/70* (2006.01)
*H05B 6/80* (2006.01)
*F24C 15/32* (2006.01)

(52) U.S. Cl. .............. 99/422; 99/451; 99/476; 219/681; 219/400; 126/21 A

(58) Field of Classification Search .................... 99/422, 99/424, 451, 474, 476; 126/21 A; 219/681, 219/400
See application file for complete search history.

(56) References Cited

U.S. PATENT DOCUMENTS

| | | | |
|---|---|---|---|
| 2,563,253 A | 8/1951 | Levin | |
| 2,704,802 A | 3/1955 | Blass et al. | |
| 3,210,511 A | 10/1965 | Smith | |
| 3,548,152 A | 12/1970 | Klepzig | |
| 3,581,038 A | 5/1971 | Williams | |
| 3,813,216 A | 5/1974 | Baur et al. | |
| 3,828,760 A | 8/1974 | Farber et al. | |

(Continued)

FOREIGN PATENT DOCUMENTS

CN 2348616 11/1999

(Continued)

OTHER PUBLICATIONS

International Search Report and Written Opinion dated Feb. 11, 2009 in related Application No. PCT/US2008/081689.

(Continued)

*Primary Examiner* — Reginald L Alexander
(74) *Attorney, Agent, or Firm* — Dean W. Russell; Kristin M. Crall; Kilpatrick Townsend & Stockton LLP

(57) ABSTRACT

A high-speed griddle for cooking food products has a griddle platen having a cook surface for receiving food products thereon, and heating means are provided for heating the platen. A clamshell cover is configured for sealing contact with the cook surface of the platen, the cook surface and cover cooperating to enclose a cook volume. An electromagnetic energy source is configured for emitting energy into the cook volume, the energy source emitting energy of a frequency selected to cause internal heating of food products within the cook volume. In addition, a convection air system is configured to provide a flow of heated air into the cook volume. The heated platen, electromagnetic energy source, and convection air system cooperate to rapidly cook food products within the cook volume.

8 Claims, 5 Drawing Sheets

U.S. PATENT DOCUMENTS

| | | | |
|---|---|---|---|
| 3,973,551 A | 8/1976 | Caselani et al. | |
| 4,154,861 A | 5/1979 | Smith | |
| 4,160,144 A | 7/1979 | Kashyap et al. | |
| 4,180,145 A | 12/1979 | Rueggeberg | |
| 4,283,614 A | 8/1981 | Tanaka et al. | |
| 4,316,069 A | 2/1982 | Fitzmayer | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,354,083 A | 10/1982 | Staats | |
| 4,403,128 A | 9/1983 | Takagi et al. | |
| 4,409,453 A | 10/1983 | Smith | |
| 4,431,889 A | 2/1984 | Saponara et al. | |
| 4,464,554 A | 8/1984 | Bakanowski et al. | |
| 4,480,164 A | 10/1984 | Dills | |
| 4,494,525 A | 1/1985 | Albertsen | |
| 4,737,373 A | 4/1988 | Forney | |
| 4,752,268 A | 6/1988 | Kataoka et al. | |
| 4,786,774 A | 11/1988 | Kaminaka | |
| 4,849,597 A | 7/1989 | Waigand | |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,025,775 A | 6/1991 | Crisp | |
| 5,161,889 A | 11/1992 | Smith et al. | |
| 5,166,487 A | 11/1992 | Hurley et al. | |
| 5,204,503 A | 4/1993 | Maiellano et al. | |
| 5,277,105 A | 1/1994 | Bruno | |
| 5,369,250 A | 11/1994 | Meredith | |
| 5,401,940 A | 3/1995 | Smith et al. | |
| 5,513,558 A * | 5/1996 | Erickson et al. | 99/330 |
| 5,555,795 A | 9/1996 | Tsai | |
| 5,676,870 A | 10/1997 | Wassman et al. | |
| 5,717,192 A | 2/1998 | Dobie et al. | |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,201,217 B1 * | 3/2001 | Moon et al. | 219/386 |
| 6,250,296 B1 | 6/2001 | Norris et al. | |
| 6,369,360 B1 | 4/2002 | Cook | |
| 6,373,037 B1 * | 4/2002 | Brown et al. | 219/681 |
| 6,376,817 B1 | 4/2002 | McFadden | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 | 10/2002 | Brown et al. | |
| 6,472,647 B2 | 10/2002 | Lee et al. | |
| 6,481,999 B2 | 11/2002 | Knost | |
| 6,541,745 B2 * | 4/2003 | Kim et al. | 219/681 |
| 6,655,373 B1 | 12/2003 | Wiker | |
| 6,712,063 B1 | 3/2004 | Thorneywork | |
| 6,713,741 B2 | 3/2004 | Miller | |
| 6,874,495 B2 | 4/2005 | McFadden | |
| 6,909,078 B2 | 6/2005 | Lee et al. | |
| 7,055,518 B2 | 6/2006 | McFadden | |
| 7,087,872 B1 | 8/2006 | Dobie et al. | |
| 7,360,533 B2 | 4/2008 | McFadden | |
| 7,507,938 B2 | 3/2009 | McFadden | |
| 2001/0054605 A1 | 12/2001 | Suzuki et al. | |
| 2002/0179588 A1 | 12/2002 | Lubrina et al. | |
| 2003/0226452 A1 | 12/2003 | Artt | |
| 2004/0118392 A1 | 6/2004 | McFadden | |
| 2004/0123858 A1 | 7/2004 | McFadden | |
| 2004/0200828 A1 | 10/2004 | Becker et al. | |
| 2004/0211765 A1 | 10/2004 | McFadden | |
| 2004/0216732 A1 | 11/2004 | McFadden | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0194011 A1 | 8/2007 | McFadden | |
| 2007/0295322 A1 | 12/2007 | Dobie et al. | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | McFadden | |
| 2008/0296284 A1 | 12/2008 | McFadden | |

FOREIGN PATENT DOCUMENTS

| | | | |
|---|---|---|---|
| DE | 2557867 | | 6/1977 |
| DE | 3119596 | A1 | 12/1982 |
| DE | 8801849 | U1 | 3/1988 |
| DE | 3734958 | A1 | 4/1989 |
| EP | 0 096 159 | | 12/1983 |
| EP | 0429822 | | 6/1991 |
| EP | 0429822 | A1 | 6/1991 |
| EP | 0534787 | A1 | 3/1993 |
| GB | 2 043 237 | | 10/1980 |
| GB | 2043237 | | 10/1980 |
| JP | 62218736 | A | 9/1987 |
| JP | 63-317068 | | 12/1988 |
| JP | 3-237943 | * | 3/1991 |
| WO | WO 9836619 | | 8/1998 |
| WO | WO 2004/014139 | | 2/2004 |
| WO | WO 2005/041672 | | 5/2005 |
| WO | WO 2005/087009 | | 9/2005 |
| WO | WO 2006/041814 | | 4/2006 |
| WO | WO 2006/081202 | | 8/2006 |
| WO | WO 2006/099394 | | 9/2006 |
| WO | WO 2009058934 | | 5/2009 |

OTHER PUBLICATIONS

Rueggeberg, 'A Multislotted Waveguide Antenna for High-Powered Microwave Heating Systems,' IEEE Transactions on industry Applications, IA-16(6):809-813 (1980).
Supplementary Search Report dated Mar. 4, 2009 in related European Application No. 04816933.
Response dated Dec. 17, 2008 in related U.S. Appl. No. 10/591,074.
Response dated Jan. 16, 2009 in related U.S. Appl. No. 11/392,050.
Response dated Jan. 16, 2009 in related U.S. Appl. No. 10/614,532.
Office Action dated Feb. 5, 2009 in related U.S. Appl. No. 11/928,063.
Response dated Nov. 13, 2008 in related U.S. Appl. No. 11/663,253.
Office Action dated Mar. 18, 2009 in related U.S. Appl. No. 11/663,253.
Response dated Jan. 23, 2009 in related U.S. Appl. No. 10/614,268.
Office Action dated Apr. 14, 2009 in related U.S. Appl. No. 10/614,532.
Response dated Jul. 7, 2009 in related U.S. Appl. No. 10/614,532.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/392,050.
Office Action dated Apr. 15, 2009 in related U.S. Appl. No. 10/591,074.
Abstract JP2000254001 sublished Mar. 8, 1999.
Partial International Search report in related Application No. PCT/US2008/056358.
U.S. Appl. No. 11/928,037, filed Oct. 30, 2007, McFadden.
Office Action dated Oct. 3, 2008 in related U.S. Appl. No. 10/591,074.
Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.
Office Action dated Feb. 4, 2008 in related U.S. Appl. No. 10/614,268.
Response dated Aug. 4, 2008 in related U.S. Appl. No. 10/614,268.

Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
Response dated Aug. 4, 2009 in related U.S. Appl. No. 11/928,063.
Office Action dated Jul. 15, 2009 in related U.S. Appl. No. 11/908,169.
Office Action dated Jul. 23, 2009 in related U.S. Appl. No. 11/928,007.
Response dated Jul. 21, 2009 in related U.S. Appl. No. 11/663,253.
U.S. Appl. 11/908,169, filed Sep. 10, 2007, McFadden
U.S. Appl. No. 12/045,063, filed Mar. 10, 2008, Dougherty.

* cited by examiner

GRIDDLE

CROSS REFERENCE TO RELATED APPLICATIONS

The present application claims priority to International Application No. PCT/US2005/035605 filed 5 Oct. 2005; claims priority to U.S. application Ser. No. 11/098,280 filed 4 Apr. 2005 now U.S. Pat. No. 7,360,533; claims priority to International Application No. PCT/US2006/009075 filed 14 Mar. 2006 now U.S. Pat. No. 7,836,875 and claims priority to U.S. application Ser. No. 11/392,050 filed 29 Mar. 2006. Upon entry into the National Stage in the United States of America, the present application will be a continuation-in-part of U.S. application Ser. No. 11/098,280 filed 4 Apr. 2005; will be a continuation-in-part of U.S. application Ser. No. 10/614,268 filed 7 Jul. 2003 now U.S. Pat. No. 7,836,874; will be a continuation-in-part of U.S. application Ser. No. 10/614,532 filed 7 Jul. 2003 still pending; and will be a continuation-in-part of U.S. application Ser. No. 11/392,050 filed 29 Mar. 2006.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with International Application No. PCT/US2005/035605 filed 5 Oct. 2005; contains technical disclosure in common with International Application No. PCT/US2006/009075 filed 14 Mar. 2006; contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All of the applications set forth above are incorporated herein by reference as if fully set forth.

BACKGROUND

1. Field of the Invention

The present invention relates generally to griddles for cooking and specifically to griddles having microwave and convection assistance to reduce cooking times.

2. Description of Related Art

The griddle is a basic piece of equipment in a large number of commercial food service establishments. Griddle cooking, which is conduction cooking, has several very desirable effects, including coagulation of proteins, flavor development (e.g., browning of meats), tenderizing some animal tissues, fat melting (e.g., bacon), product drying (e.g., pancakes), and the development of crusts. These cooking qualities, coupled with the simple construction and operation of the griddle, have made it an indispensable cooking device in most commercial kitchens.

Modern griddles come in several configurations, including both conventional griddle and clamshell griddles. A conventional (single-sided) griddle consists of a single heated platen that is typically either electric or gas-fired. The griddle will have simple thermostat control of one or more cook zones featuring a flat or grooved griddle platen. A clamshell griddle is a flat or grooved griddle platen with an additional hinged upper platen that cooks the top side of the product.

Commercial single-sided griddles have a number of disadvantages and limitations, including 1) relatively high heat gain to the kitchen, 2) high operating costs, 3) lengthy pre-cooking warm-up time, 4) undesirable variation in batch-to-batch cooking times, 6) uneven heat transfer to the food items being cooked, and/or 7) the inability to vary the relative cooking rates for small or large food portions. With a single-sided griddle it is necessary for the operator to turn product (e.g., hamburger patties) over after they have been cooked on one side for cooking on the second side. This increases the amount of operator attention required for cooking these food products and also increases the cooking time. A typical technique employed by restaurants to insure that the food is properly cooked (food safety need) is to "flip" or turn the food product always to an adjacent hot griddle platen area thereby effectively reducing the usable service of the griddle platen.

Improved singled-sided griddle designs such as high-pressure steam heated griddles or those featuring very conductive griddle materials (e.g., copper clad with thin stainless) have greatly reduced griddle plate temperature variation and provided for faster recovery times. Having a cook surface with a more uniform temperature coupled with a fast temperature recovery increases the cook capacity of the griddle (weight of cook per area per minute). Reducing griddle surface temperature variations also achieves a decrease in food safety issues. While these improvements are desirable, they have a significantly increased fabrication cost above the costs for a conventional griddle. Two-sided griddles were developed to further improve speed, cooking capacity, and food safety.

Two-sided griddles utilizing both upper and lower cooking platens have been in use for many years. Early adopters of this technology were driven to do so by the need to shorten cook times for hamburger patties as well as to greatly reduce food safety concerns. A two-sided griddle also reduces the amount of operator attention and training required for cooking hamburger patties. A hamburger patty cook time may be reduced by 50% (2× the cooking speed) when compared to cook times on a conventional griddle. Two-sided griddle designs may be divided into three categories: 1) non-contact upper platen ("conventional two sided method"), 2) contact upper platen, and 3) broiler upper platen ("Lang method").

A conventional, non-contact clamshell griddle has a lower griddle platen that may be heated by either electric resistance heating or by gas fueled burners. Typically, an upper platen is electrically heated, and the platen is made from aluminum or steel. The upper clamshells are typically about 2 feet wide, so that a 4-foot griddle would utilize 2 independent clamshells. The upper cooking platens are generally large enough to enable the operator to cook a number of individual hamburger patties or other items at the same time. During operation the upper platen is lowered to just above the food, which is positioned on the lower griddle platen. To maximize heat transfer to the top surface of the food product, the top platen is positioned as close as possible to the product without contacting the product. By avoiding contact, the heat transfer rate is reduced, but it eliminates the possibility of product sticking to the upper platen when it is raised at the end of the cook cycle. The upper platen is moved to an open position to allow his easy access to the lower griddle surface. A clamshell griddle can be used as conventional singled sided griddle for product not suitable for two-sided cooking (e.g., products of non-uniform cross-section).

A griddle having a contact upper platen is typically used to apply heat to both sides of a relatively thin, homogenous product, such as a hamburger patty. This type of cooking reduces the length of the conduction path to the center of the product by about 50%, and cook times are approximately halved. The contact upper platen griddle design accomplishes this goal by contacting and pressing down on the product with the upper platen during the cook cycle. One method of preventing food product from sticking to the upper platen involves using a Teflon® release sheet placed between the upper surface of the product and the cooking surface of the upper platen. This permits high heat transfer rates but eliminates the sticking of product to the cooking surface of the upper platen.

Cooking hamburger patties using this approach requires the contact-style double-sided griddle to have a number of special features, including the need for the upper platen cooking surface to remain parallel to the lower cooking surface through out the cooking process and that the upper griddle move downwards as the patty shrinks. For example, frozen patties are relatively rigid when initially placed on the lower cooking platen. If the upper platen rests only on the thickest patty or patties, even small differences in the platens being parallel form right-to-left or front-to-back or small variations in patty thickness can prevent or delay proper heat transmission from the upper platen to some of the product. This can result in non-uniform product center temperatures yielding poor product quality or causing food safety issues. On the other hand, the patties typically soften and shrink or decrease in thickness as they thaw and cook, and the weight of the upper cooking platen can excessively compress the hamburger patties, which can adversely affect the texture and appearance of the cooked patties. Therefore, control of the motion of the platen is critical for a properly cooked product.

Two-sided grills with a contact upper platen present several special problems including: 1) accommodating variations in initial thickness of the individual patties in the group being cooked; 2) accommodating the decrease in thickness of the patties that occurs during cooking; 3) preventing excessive compaction of the patties; and 4) accommodating different groups of patties of nominally different thicknesses. In addition, there is the problem of moving a relative heavy upper platen at the beginning and end of the cooking cycle. The platen weight requires the use of very robust lift mechanisms that provides for uniform contact with the food product and provides for a controlled drop as the food product shrinks. Using a release sheet to prevent food from sticking to the upper platen is both expensive and adds operational complexity. In addition, the preformed food, such as hamburger patties that come in several different nominal sizes and thicknesses and are commonly frozen, must have precise production dimensional tolerances relative to thickness if the contact approach is to work well.

Another variation of the doubled sided griddle is a griddle with a broiler clamshell in place of a clamshell upper platen. This arrangement is desirable in that the broiler subsystem cooks by radiation and does not need to be in contact with the food product to provide good top side cooking performance. Benefits include the ability to cook products of non-uniform thickness, fast recovery heat-up time for a natural-gas fueled clamshell broiler (but not with electric option due to practical power limitations), and a lighter weight clamshell assembly (heavy platens being replaced by lighter burners). However, this approach has several limitations, including: 1) longer cooking times than that provided by a contact double-sided griddle; 2) smoke issues as the oils and grease generated by the cooking process flash upon contact with hot radiant elements; 3) the inability to regulate broiler radiant temperature for different foods; 4) reduced radiant burner life due to the burners being close to the lower platen and directly exposed to cooking grease/oil contamination; and 5) a large heat gain to the kitchen.

One way to increase the speed of cooking within a microwave oven or a microwave-convection oven is to add a griddle within the oven. This is known in the art and is referred to as a grill or hot bottom. Such a feature is desirable since it provides browning of the food product, which is not otherwise achieved with microwave cooking. A griddle is used to cook food by direct contact with a metal plate maintained at an elevated temperature (e.g., 300° F. (148.89° C.) to 375° F. (190.56° C.) by applying heat to the interior or bottom side of the platen. In one such oven, the griddle is located in an aperture in the floor of the cooking cavity.

An oven with a griddle plate differs fundamentally from a double-sided griddle in several areas including:

1) A griddle has an independent, temperature-controlled lower bottom platen, whereas a hot plate or pan is slaved to the oven temperature. No independent top and bottom energy control is provided for cooking food placed on a griddle plate in oven.

2) In a clamshell griddle the upper heating means moves relative to the food placed on the lower griddle surface, whereas in an oven the entire heating means remains fixed relative to the food placed in the oven cavity.

3) A clamshell griddle can be operated as conventional one sided griddle, whereas an oven with a griddle function always applies energy to the top and bottom of the food.

4) Ovens with a griddle function control energy to the food based primarily on oven air temperature and not the actual griddle plate conditions.

Although great strides have been made in the area of griddles, many short comings remain.

SUMMARY OF THE INVENTION

There is a need in the art for a cooking apparatus that combines a griddle with electromagnetic and convection heating to reduce cooking times.

This object is achieved by providing a cooking apparatus that combines a griddle with electromagnetic and convection heating to reduce cooking times.

A high-speed griddle for cooking food products has a griddle platen having a cook surface for receiving food products thereon, and heating means are provided for heating the platen. A clamshell cover is configured for sealing contact with the cook surface of the platen, the cook surface and cover cooperating to enclose a cook volume. An electromagnetic energy source is configured for emitting energy into the cook volume, the energy source emitting energy of a frequency selected to cause internal heating of food products within the cook volume. In addition, a convection air system is configured to provide a flow of heated air into the cook volume. The heated platen, electromagnetic energy source, and convection air system cooperate to rapidly cook food products within the cook volume.

DESCRIPTION OF THE DRAWINGS

The novel features believed to be characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

The present invention is directed to a clamshell griddle having a heated platen and a clamshell enclosing the food product and delivering both electromagnetic energy and high temperature/high velocity convection air flow for rapidly cooking the food. The invention provides for a 50% to 70% reduction in griddle times as compared to a contact-style clamshell unit and a 400% to 600% reduction in griddle times as compared to a single-sided griddle. These results are achieved by delivering a portion of the energy used for cooking internal to the food, and this internal heating reduces the need to conduct all of the cooking energy from the surface to the interior. In addition, the griddle of the invention rapidly cooks products of non-uniform and varying thickness and greatly reduces platen position control/mechanism complexity.

The rapid cook clamshell griddle subject of this invention has three heat transfer means to the food: 1) at least one griddle platen providing contact or conduction heat transfer to the food; 2) high velocity convection heat transfer to the food; and 3) electromagnetic energy input to the food for internal heating. The convection and electromagnetic types of heating are delivered through a clamshell on each griddle platen.

Internal heating is typically accomplished by either radio frequency (RF) or microwave radiation, the latter being the preferred method for use in the present invention. Given the small size and low cost nature of current microwave components, and its general compatibility with wide range of types, sizes/shapes, and surface texture of food products, microwave technology is well suited for this application. Heating through use of RF is limited to applications where there is not a large variability in food thickness and not a rough/irregular food surface texture, which can lead to RF energy causing the food to burn. For products like hamburgers or boneless chicken breasts, RF energy may be very suitable.

Convection air is supplied to a griddle cook volume enclosed by the clamshell. The heated air passes through perforated plates in the upper griddle clamshell that direct airflow to the top and sides of the food product. The forced convection air is introduced into the griddle cook volume at an angle relative to the plane of the griddle platen. The resulting highly turbulent flow has the following benefits: 1) creation of a griddle cook zone airflow that is averaged spatially (a flow condition that tends to average out the highs and lows in flow variation for a given point in the cook cavity), which greatly reduces the design complexity needed to impose a uniform flow field over a cooking zone; and 2) conflicting air flows associated with this "X" style flow field produce both the high heat transfer rates needed for rapid cooking and the average flow conditions over space and time needed to produce uniform cooking/browning.

Figure 2:
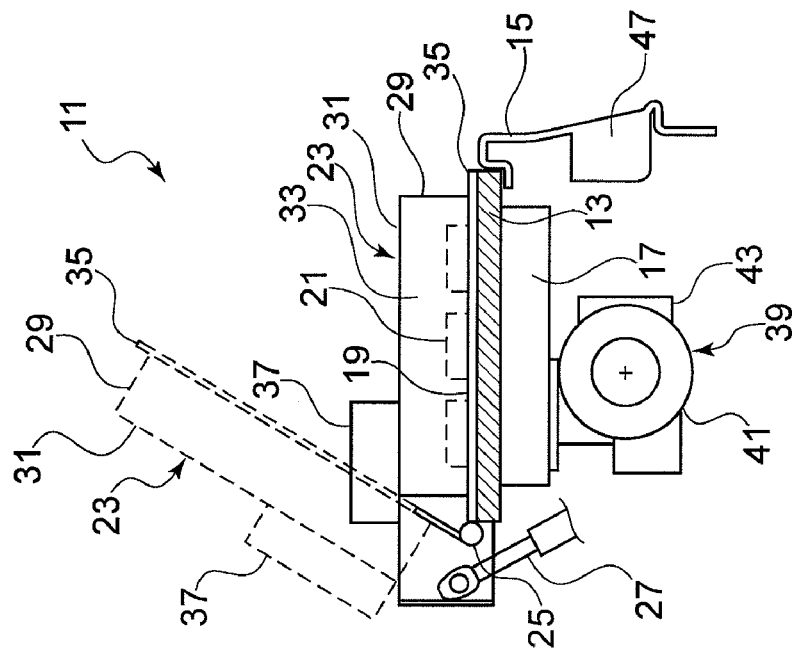
FIG. 2 is a side view of the griddle of FIG. 1.
Figure 1:
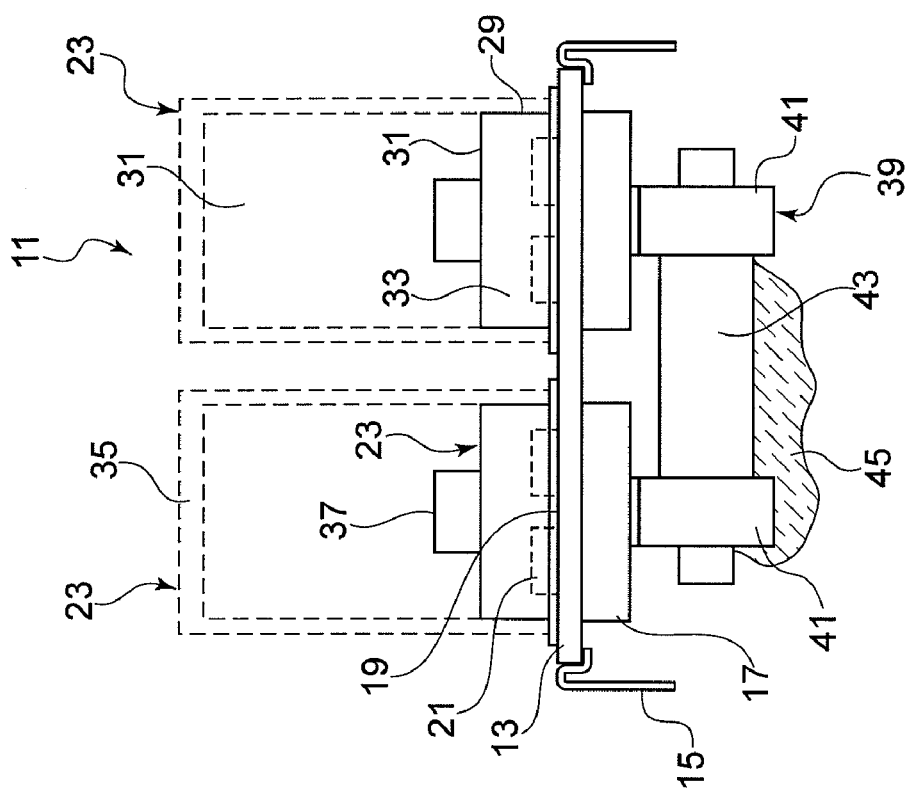
FIG. 1 is a front view of a preferred embodiment of a griddle according to the present invention.

FIG. 1 through 5 show a preferred embodiment of the present invention. Referring now to FIGS. 1 and 2, griddle 11 has a griddle platen 13 mounted on a frame 15 and heated by platen heater 17. Platen heater 17 may use electric resistance heating or gas-fired heating to heat platen 13. Platen 13 has an upward facing cook surface 19 onto which food 21 (shown by broken lines) is placed for cooking. Surface 19 may be smooth or grooved. Griddle 11 comprises one or more clamshells 23. For example, a 4-foot (1.22 m) griddle 11 would typically have 2 independent clamshells 23 each with a width of about 24 inches (0.61 m). In the embodiment shown, a pair of clamshells 23 is hinged to frame 15 on generally horizontal pins 25, and a lift mechanism 27 for each clamshell 23 is attached to a rear portion of the associated clamshell 23 for assisting the user in opening and closing clamshells 23.

Clamshells 23 are shown in a closed position by solid lines, which is the position used during normal cooking, and in an open position by broken lines, which is the position used during loading/unloading of griddle 11 or during single-sided cooking. Each clamshell 23 comprises generally vertical sidewalls 29 and a top 31, which cooperate to form an enclosed cook volume 33 when clamshell 23 is closed against cook surface 19 of platen 13. A flange 35 rests on cook surface 19 when clamshell 23 is in the closed position, and flange 35 acts a choke for electromagnetic energy produced by magnetron 37 to limit leakage to below the allowable limit. Magnetron 37 emits electromagnetic energy into cook volume 33 to internally heat food 21. A convection air heating and supply system 39 comprises blowers 41 and catalyst/grease handler/heater box 43 for producing heated air and forcing the air into cook volume 33 of each clamshell 23 for cooking the top surface of food 21. Insulation 45 surrounds system 39 to minimize heat loss and prevent the user from being injured through contact with hot components of system 39. A control panel 47 has controls for operating the heating components of griddle 11.

Each lift mechanism 27 provides for open and closing of clamshell 23 either manually, using, for example, counterweight balances to balance the weight of clamshell 23, or automatically by, for example, electromechanical, pneumatic, or hydraulic lifting actuators. Because the lower surface of flange 35 rests on cook surface 19, the requirement for precision positioning mechanisms associated with contact style clamshell designs is eliminated. To simplify ducting, blowers 41 are affixed to frame 15, and sliding or flexible connections are used between the air distribution system of clamshells 23 and the discharge of blowers 41.

Figure 3:
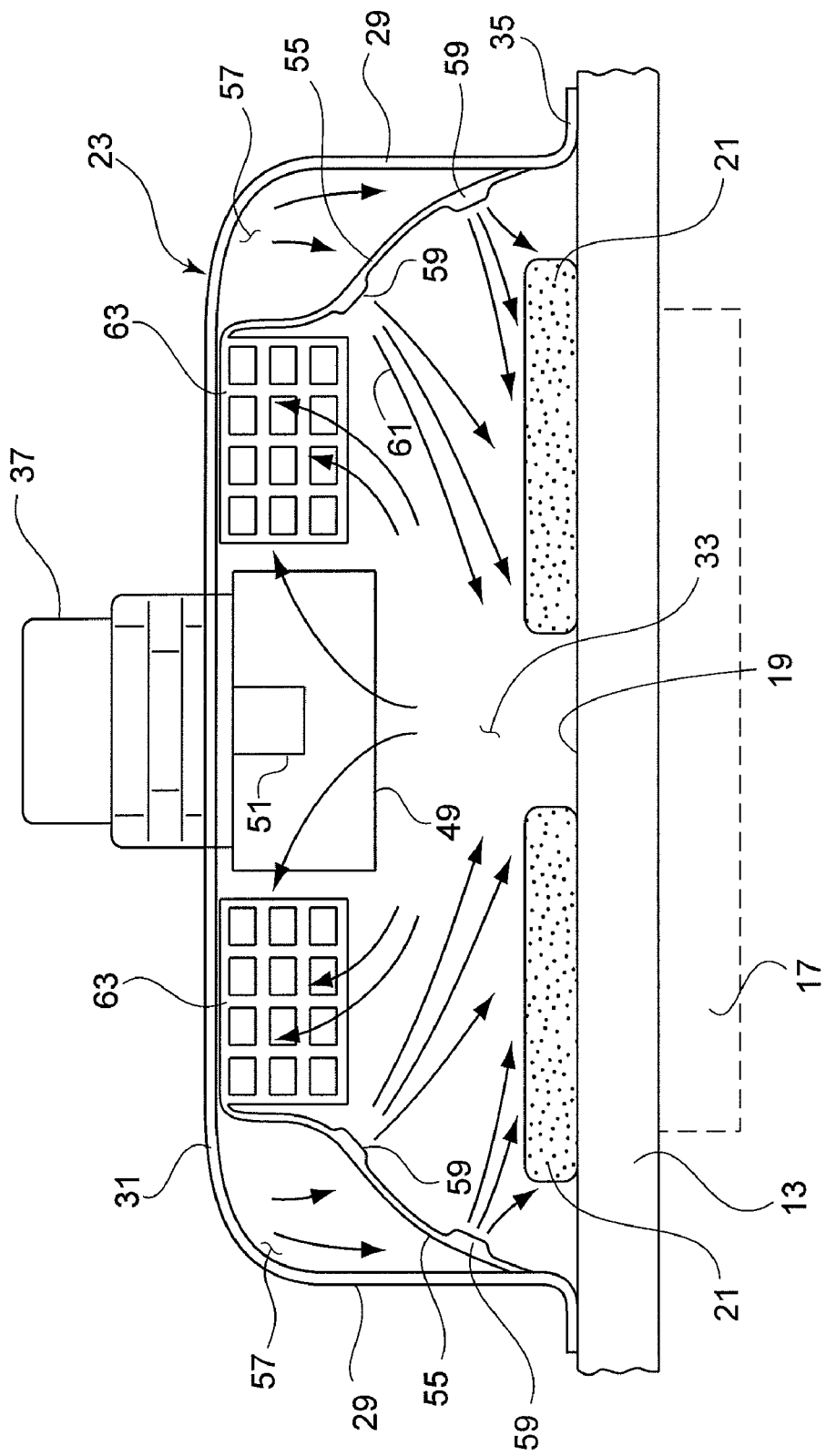
FIG. 3 is an partially sectioned, enlarged front view of a portion of the griddle of FIG. 1.
Figure 4:
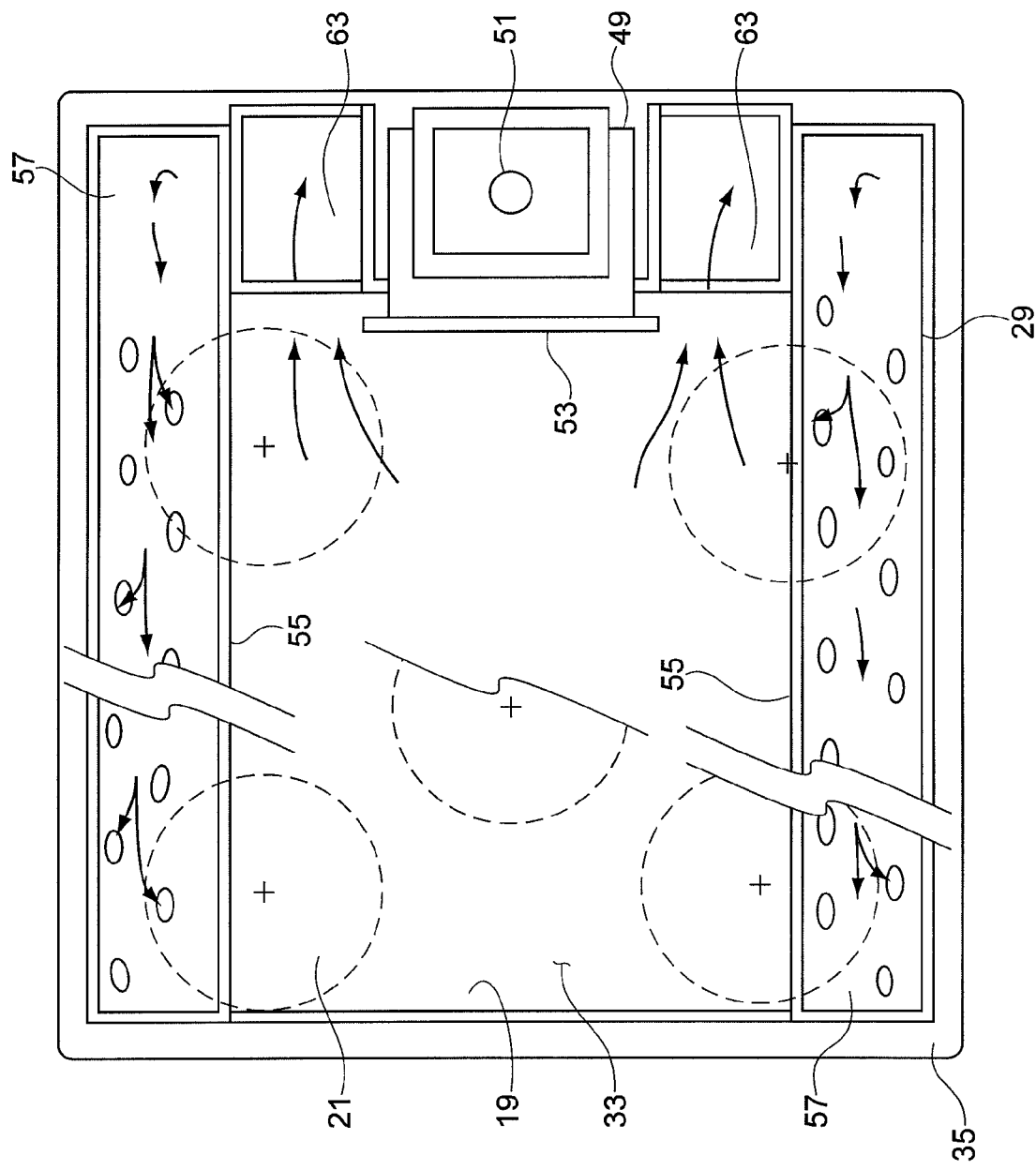
FIG. 4 is a cross-section top view of a portion of the griddle of FIG. 1.
Figure 5:
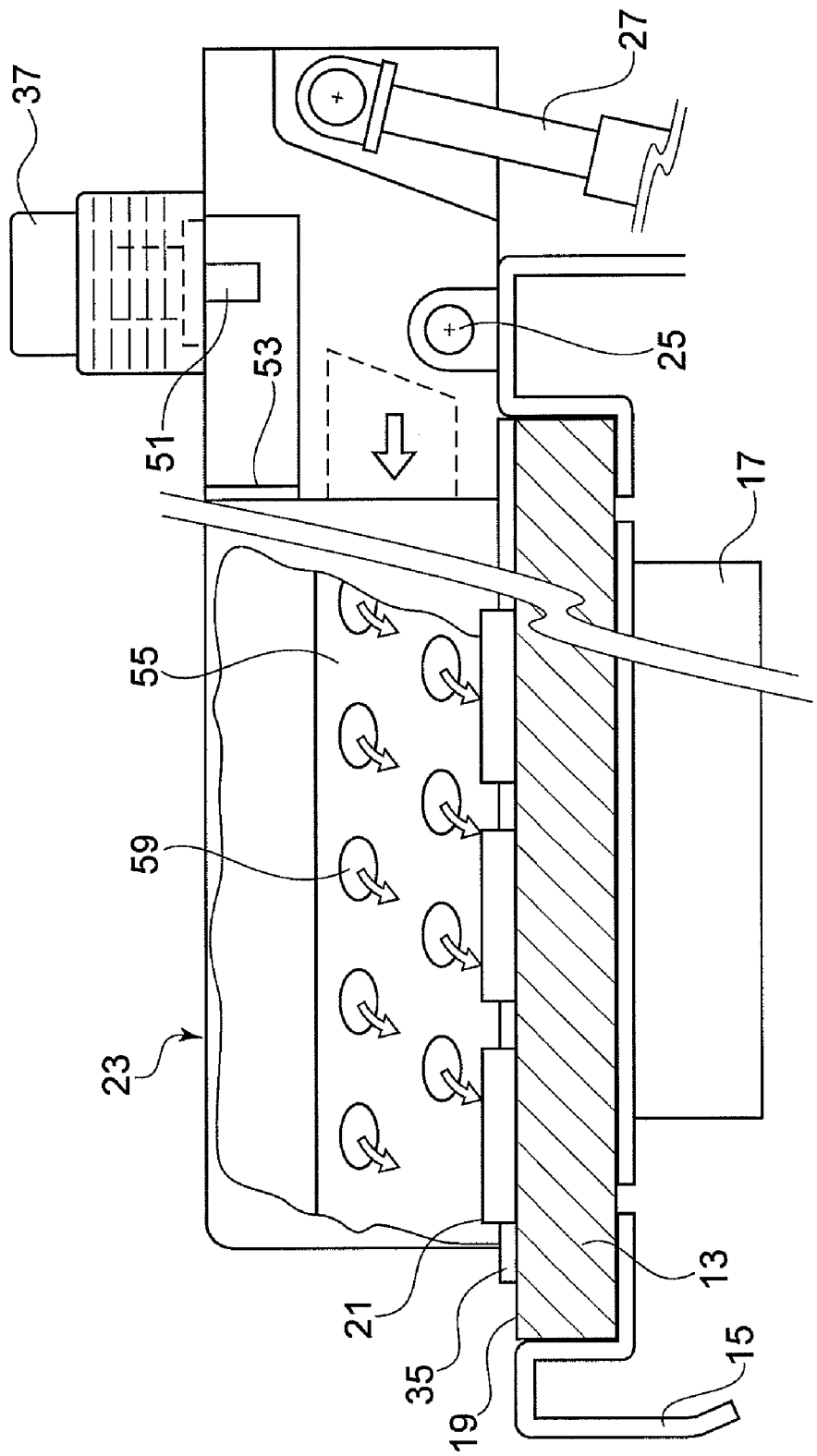
FIG. 5 is a partially sectioned side view of a portion of the griddle of FIG. 1.

Referring now to FIGS. 3 through 5, clamshells 23 incorporate a convention air distribution and return system, described in detail below, to provide the heated air from convection air supply system 39 in a conflicting/colliding airflow within cook volume 33. Clamshells 23 also comprise a microwave waveguide 49 and tube antenna, which are used to couple output of magnetron 37 to cook volume 33. A cover 53 covers and protects waveguide 49 and tube antenna 51 within cook volume 33.

Each clamshell 23 has a pair of convection air plates 55 located on opposite sides of cook volume 33. An upper end of each plate 55 is attached to top 31 of clamshell 23, and a lower end of each plate 55 is attached to a side wall 29. Each air plate 55 defines an air cavity 57, which is in fluid communication with convection supply system 39 to receive pressurized, heated air therefrom. The heated air passes out of cavities 57 and into volume 33 through holes 59 in plates 55. Holes are oriented to direct airflow, indicated by flow lines 61, toward food 21 on platen 13.

Once the air has circulated around the food, it is drawn to the back of clamshell 23 for return to catalyst/heater box 43 to be reheated in system 39 and supplied again to air cavities 57. Return air from cook volume 33 passes through grates 63, which may incorporate filters for removing particulates and airborne grease droplets. Grates 63 are located in an upper rear portion of clamshell 23, and the upward return path along top 31 between angled air plates 55 permits the return air velocity to be reduced, which permits heavier grease droplets to drop out, reducing the grease load that the grease handler must eliminate.

Preferably, a single energy source is used to supply heat to the air returning to blowers 41. The convection air heater may use either electrical or natural gas as an energy source. Because heater box 43 is fixed to the chassis, gas and electrical connections are simplified. For a gas-fired system heater 43, only a single burner and ignition module are needed.

Convection air flow rate can be adjusted or is variable during the course of a recipe/cook cycle. Modulation of the output of blowers 41 is accomplished via a variable speed blower motor (e.g., brushless DC) or electromechanical air dampers/valves (not shown). During the cook cycle the hot convection air flow can be cycled from minimum to maximum flow conditions. For example, for a 4-foot long (1.22 m) griddle with two 2-foot (0.61 m) wide clamshells 23, the convection flow within each clamshell 23 may have a maximum of about 200 to 500 cfm. Minimum flow conditions are typically set at about 5% of maximum for griddles configured with a catalytic filter kit in order to provide air flow through the catalyst. This small flow rate prevents catalyst overheating and provides continuous air cleaning when clamshells 23 are in the open position.

To achieve high convective heat transfer rates (greater than 15 btu/hr*ft$^2$*F) needed to rapidly brown or grill the upper surfaces of food 21, the maximum average nozzle velocity through holes 59 is greater than 4500 ft/min (1,371.60 m/min). This high velocity air jet, coupled with their flow angle relative to food 21 creates the conflicting/colliding airflow pattern mentioned above. The angle of each air plate 55 is defined by the air velocity vector having an angle relative to the horizontal plane of platen surface 19 of preferably greater than approximately 30 degrees and less than approximately 90 degrees.

An electromagnetic power source, such as magnetron 37, distributes energy within cook volume 33, as defined by the associated clamshell 23. As shown in FIG. 1 through 5, each clamshell 23 includes one magnetron 37 mounted to a waveguide 49 incorporated into clamshell 23. A waveguide cover 53 isolates waveguide 49 from the cooking environment, and typical covers suitable for this application include quartz and Teflon® sheet reinforced with fiberglass.

To eliminate flexible waveguide connections between a stationary magnetron and movable waveguide attached to the upper waveguide, magnetron 37 is mounted to the clamshell 23 near pin 25, requiring only minimal flexing of the high voltage wire connection. Preferably, a standard 2.45 GHz magnetron tube is used, producing a maximum power level for a 3 (0.91 m)- to 4-foot (1.22 m) long griddle of around 1500 to 2000 Watts (delivered to the food), or approximately 1000 watts per tube. The microwave feeds are centered near the top of clamshell 23, such that nearly equal energy is distributed over the griddle cook area within volume 33.

As shown in the figures, flange 35 contacts surface 19 of platen 13, and flange 35 has a width of about 2.4 inches (6.10 cm) or ½ the free space wavelength for a 2.4 GHz microwave frequency. To form a low leakage microwave seal between clamshell 23 and platen 13 a microwave choke (¼ (0.25) wavelength choke) is incorporated into flange 35. Microwave safety switches are located on clamshell 23 and are positioned at the front corners of flange 35.

In operation, food product 21 is placed on cook surface 19 of griddle platen 13, and clamshell 23 is lowered to the closed position. The microwave safety switches are engaged (3 switches—primary, secondary, monitor), and the microwave and convection air circuits are enabled. Control panel 47 is used to control the convection air temperature and flow rate, the microwave power, and the griddle platen temperature. The convection air flow rate and microwave power may be varied over the course of the cook cycle. Microwave power may be varied from 0 to 100% and convection flow rate (e.g., cfm or m$^3$/min) may also be varied from 0 to 100%. When the cook cycle is complete, the convection air flow is reduced to less than 5% of maximum flow, and the microwave power is turned off. Clamshell 23 is raised, and the finished griddled products 21 are removed form griddle surface 19.

Figure 6:
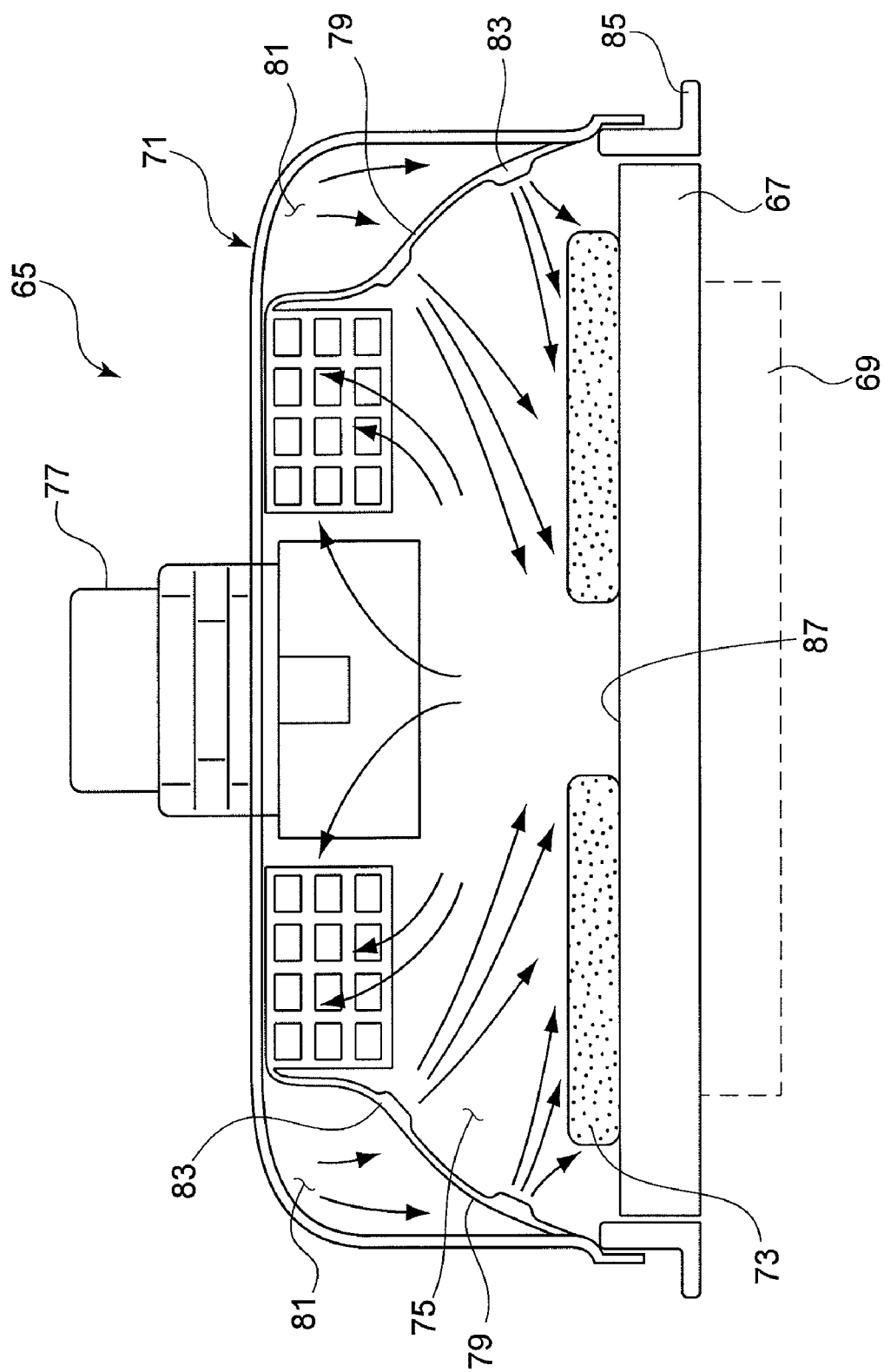
FIG. 6 is a partially sectioned front view of an alternative embodiment of a griddle according to the present invention.

Referring to FIG. 6, an alternative embodiment according to the invention is shown. Griddle 65 is constructed similarly to griddle 11 of FIGS. 1 through 5. Griddle 65 has a griddle platen 67 heated by heaters 69 and has a rotatable clamshell 71 for enclosing food 73 in cook volume 75. A magnetron 77 is mounted to clamshell 71 for emitting electromagnetic energy into cook volume 75. Air plates 79 are attached within clamshell 71 for defining air cavities 81, and heated, pressurized air is supplied through air cavities 81 and passes through holes 83 of air plates 79 to convectively cook upper surfaces of food 73. Unlike clamshell 23 of griddle 11, clamshell 71 has a flange that sits below cook surface 87 of platen 67 when clamshell 71 is in a closed position, as shown.

Rapid cook griddles generate a higher grease load in the convection air stream given the cook cycle is very short and that the total amount of grease generated during a conventional and rapid cook is about the same. To prevent excessive grease build-up in ducting of clamshell 23, a means to remove grease from the convection air is incorporated into griddle 11. Grease control is accomplished by a combination of return air flow velocity and filtering. Immediately after the air exits the cook volume 33, it passes through a grease control element (filter) mounted at the back of clamshell 23. This element mechanically separates the grease particles greater than 3.0 microns from the airflow. This location makes it ease to install and service such an element as front access can be provided.

By extracting the larger grease particles near the source, managing grease build-up in the down stream ducts and heater area is simplified. However, an additional level of grease control may be needed (depending on products to be prepared) to minimize grease build-up in blowers 41 and supply duct areas. The blower wheel of each blower 41 acts much like a centrifugal separator and will separate and coalesce the small grease particles in the blower scroll area and discharge larger particles into the supply area. To control this effect, a catalyst material (e.g., corrugated foil coated with catalyst, or catalyst coated screens) is placed up stream of the inlet of blowers 41. The catalyst acts to combust (oxidize) the small grease particles and grease vapor.

Standard griddle installations are fitted with an exhaust hood system that controls both heat gain to the kitchen space and eliminates grease laden air from the kitchen. Given griddle 11 can be operated as a standard griddle when clamshells 23 are in the open position, a typical griddle exhaust hood kit, including fire suppression, welded exhaust ducts (Type 1 duct), and a fire rated chase would be required. If griddle 11 is only used with clamshells 23 down and the convection air subsystems operating, the griddle 11 can be installed without an exhaust hood kit, due to the fact that the filter/catalyst can provide the needed grease control to meet UL 197 SB for commercial appliances operating in a vent-free or recirculating mode.

Electronic griddle cooking controls on control panel 47 permit a variety of food products 21 to be cooked with griddle 11 by varying the power of energy sources of clamshell 23 over the cook cycle. Each food product type may have a unique cook profile, which would be accomplished by varying energy source outputs over several cook stages or event. The temperature of platen 13 would be controlled to a desired griddling temperature over the cook cycle.

The convection heat transfer temperature provided by clamshell 23 would be controlled independently of the temperature of griddle platen 13. This permits additional cooking flexibility as the browning of the upper surface of food 21 can be controlled. For example, the convection air temperature may be set for 500° F. and maximum air flow to achieve broiler-like upper surface characteristics, while the griddle platen is operated at 350° F. (176.67° C.) to caramelize the juices from a meat product.

Given the possible complexity of the product cook recipes and the need to minimize labor content associated with loading a product onto griddle, an electronic controller utilizing 2 operator key strokes may be used. The user selects the appropriate recipe from the electronic controller menu and starts the controller, and then the controller executes the recipe commands for staged cooking (i.e., for each timed stage, a selected convection airflow and microwave power for a preset griddle and convection air temperatures).

An option to improve control and reduce operator error is to use a vision system to view the food products being placed on griddle (clamshells 23 up) and use the vision data to estimate product weight and type and use this information to adjust the cook recipe for load size and to prompt the operator relative to the products being griddled. For griddle 11, the vision kit would be located external to cook volume 33 for viewing the products 21 as they are placed on griddle platen 13. This permits the use of commercially available vision equipment.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

The invention claimed is:

1. A high-speed griddle for cooking food products, comprising:
    a griddle platen having a cook surface adapted to receive food products thereon;
    heating means for heating the platen, wherein the heating means is a combustion heating system;
    a clamshell cover configured for sealing contact with the cook surface of the platen, the cook surface and cover cooperating to enclose a cook volume;
    an electromagnetic energy source, the energy source being configured for emitting energy into the cook volume, the energy source being adapted to emit energy of a frequency selected to cause internal heating of food products within the cook volume; and
    a convection air system configured to provide a flow of heated air into the cook volume.

2. The high-speed griddle according to claim 1, wherein the electromagnetic energy source emits microwave energy.

3. The high-speed griddle according to claim 1, wherein the electromagnetic energy source emits radio frequency energy.

4. The high-speed griddle according to claim 1, wherein the heating means is an electrical resistance heating system.

5. The high-speed griddle according to claim 1, wherein the clamshell cover is pivotally connected to the platen.

6. The high-speed griddle according to claim 1, wherein the electromagnetic energy source is carried by the cover.

7. The high-speed griddle according to claim 1, further comprising:
    at least one air plate attached to the cover and carried within the cook volume, each air plate having holes for directing the flow of heated air from the convection air system toward the cook surface.

8. The high-speed griddle according to claim 1, wherein the convection air system comprises:
    at least one heater;
    at least one blower; and
    ducting for directing the air from an output of the blower to the cook volume.

* * * * *